June 18, 1963 D. E. SPARKS 3,094,674

METHOD AND APPARATUS FOR NEUTRALIZING MILLER EFFECT

Filed Jan. 26, 1960 2 Sheets-Sheet 1

INVENTOR.
David E. Sparks
BY John L. Wiegreffe
ATTY.

INVENTOR.
David E. Sparks
BY John L. Wiegreffe
ATTY.

United States Patent Office 3,094,674

Patented June 18, 1963

3,094,674

METHOD AND APPARATUS FOR NEUTRALIZING MILLER EFFECT

David E. Sparks, Chicago, Ill., assignor to Admiral Corporation, Chicago, Ill., a corporation of Delaware Filed Jan. 26, 1960, Ser. No. 4,773
7 Claims. (Cl. 330—76)

This invention relates to a method and apparatus for substantially eliminating the Miller effect in a vacuum tube having a screen grid, and thereby greatly reducing, especially at high frequencies, feedback from the output circuit of the tube to the input circuit. It is an object of the invention to provide an improved method and apparatus of this character.

Various forms of circuitry have been employed in the past to reduce feedback from the output of a tube to the input, especially at high frequencies. The prior art circircuits have, however, been characterized by one or more undesirable features including inconsistency of performance, criticalness of parameters, substantial variation of performance with change in signal frequency, and high cost.

As is well known in the art, the Miller effect involves the reduction in effectiveness of the screen grid of a tetrode or a pentode at high frequencies whereby feedback is permitted from the plate circuit to the control grid circuit. An important factor in the Miller effect is the inductive reactance of the internal lead of the screen grid. This reactance becomes significant at high frequencies, such that the screen grid is no longer grounded with respect to A.C. In accordance with the present invention, the inductive reactance of the internal lead of the screen grid is effectively neutralized. This is accomplished through the establishment of a balanced bridge incorporating pertinent internal impedance characteristics of the tube and selected external impedance components. The signal input appears across two opposed corners of the bridge, while the internal screen grid proper forms another corner of the bridge and the remaining corner is grounded. Since the bridge is balanced and since the screen grid and ground are connected to two null points of the bridge, the screen grid remains grounded. The inductive reactance of the internal lead of the screen grid is incorporated in the bridge and is effectively nullified. A vacuum tube input constructed in accordance with the present invention effectively grounds the screen grid of a tetrode or pentode at least over a wide band of frequencies centered about one selected frequency.

These characteristics of the present invention are obtained with a minimum number of added components whereby the incorporation of the invention in an electronic circuit is relatively inexpensive. The neutralizing of the Miller effect is highly and consistently effective and is operative over at least a wide range of frequencies of applied signal. Furthermore, the parameters of the added components need not be precise for effective neutralizing of the Miller effect.

Accordingly, it is another object of the invention to provide an improved method and apparatus for translating high frequency signals.

It is a further object of the invention to provide an improved method and apparatus for obtaining improved performance of a tetrode or pentode tube at high frequencies.

It is a still further object of the invention to provide an improved method and apparatus for obtaining improved performance at high frequencies of a vacuum tube having a screen grid through maintenance of the screen grid at A.C. ground potential in spite of the substantial inductive reactance of the internal lead of the screen grid at high frequencies.

Another object of the invention is to incorporate impedance means in an electronic circuit utilizing a screen grid vacuum tube, said impedance means being arranged to form a balanced bridge with selected internal impedances of the vacuum tube, and with the signal input being applied to opposite corners of the balanced bridge and with the internal screen grid proper and ground being connected to the other opposed corners of the balanced bridge.

A further object of the invention is to provide an improved method and apparatus for neutralizing the Miller effect in a screen grid vacuum tube and having various of the characteristics specified above while being effective over at least a wide range of frequencies.

A still further object of the invention is to provide an improved method and apparatus for neutralizing the Miller effect in a screen grid vacuum tube and having various of the characteristics specified above while being reliable and efficient in operation, and economical in construction and operation.

Further features of the invention pertain to the particular arrangement of the steps and elements of the method and apparatus for neutralizing Miller effect, whereby the above outlined and additional features thereof are attained.

The invention, both as to its organization and method of operation, together with further objects and advantages thereof, will best be understood by reference to the following specification, taken in connection with the accompanying drawings, in which.

As indicated above, the Miller effect is a high frequency phenomenon. More specifically, it becomes significant in present day tetrodes and pentodes when the frequency of the applied signal falls within the range commonly designated V.H.F. The Miller effect is significant at a frequency of 200 megacycles, this being a frequency which falls within the V.H.F. television band. At this frequency the inductive reactance of the internal lead of the screen grid of a conventional tetrode or pentode is sufficiently high that the screen grid is no longer effectively grounded with respect to A.C. Accordingly, the screen grid does not effectively shield the control grid from feedback. The present invention contemplates the neutralizing of the inductive reactance of the internal screen grid lead such that the screen grid remains substantially grounded to A.C. More specifically, the present invention contemplates the establishment of a balanced bridge which incorporates various internal impedances of the screen grid tube and external impedance components of selected values, the input signal being applied across two opposed corners of the bridge, and the other two corners of the bridge being connected to the internal screen grid proper and ground.

Figure 1:
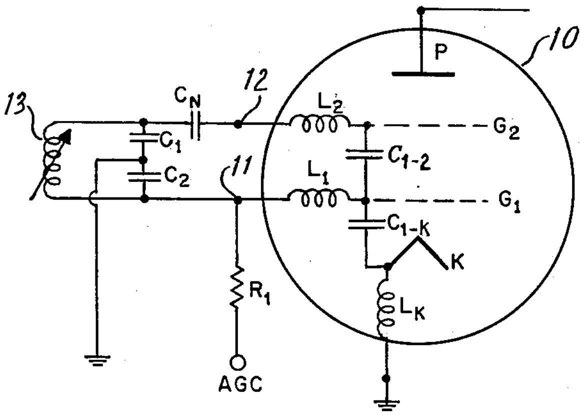
FIGURE 1 is a partial circuit diagram of a high frequency amplifier, showing in particular an input circuit incorporating the present invention.

In accordance with the embodiment illustrated in FIG. 1, the invention is applied to an amplifier employing a tetrode vacuum tube. FIG. 1 is a simplified circuit from which various conventional circuitry has been omitted in the interest of clarity.

The circuit of FIG. 1 includes a vacuum tube 10 having a plate P, a cathode K, a control grid $G_1$, and a screen grid $G_2$. The inter-electrode capacity between the two grids $G_1$ and $G_2$ is shown within the envelope of the tube 10 and is designated $C_{1-2}$. The internal lead inductance of the control grid $G_1$ and the internal lead inductance of the screen grid $G_2$ are also shown within the envelope of the tube 10 and are designated $L_1$ and $L_2$. Still further, FIG. 1 also shows the control-grid-to-cathode capacity, designated $C_{1-K}$, and the internal lead inductance of the cathode, designated $L_K$. The plate P may be connected to any suitable output circuit, not shown in FIG. 1, and the cathode K is connected to ground.

The control grid tube terminal, designated 11, is connected to one side of a tunable inductor 13 and through a resistor $R_1$ to AGC. The screen grid tube terminal, designated $L_2$, is connected through a capacitor $C_N$ to the other terminal of the input member 13. Bridging the terminals of the signal input member 13 are two series arranged capacitors $C_1$ and $C_2$, a point intermediate these capacitors being connected to ground as shown.

Figure 2:
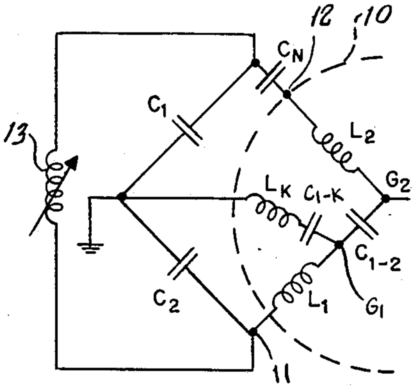
FIG. 2 is a diagram showing a portion of the input circuit of FIG. 1 arranged to illustrate the bridge incorporated therein.

Ignoring, for the moment, internal impedances $C_{1-K}$ and $L_K$ (assuming $C_{1-K=0}$), it will be seen in FIG. 2 that a portion of the input circuit including internal tube impedances $L_1$, $L_2$ and $C_{1-2}$ and the three external capacitors $C_1$, $C_2$ and $C_N$ forms a simple four armed bridge. The input signal is applied to the bridge across the upper and lower corners thereof, and the internal screen grid proper is arranged at one of the other corners of the bridge while the opposite corner is grounded. It will be appreciated that if this simple bridge is balanced, that is if the ratio of the upper left arm to the lower left arm is equal to the ratio of the upper right arm to the lower right arm in terms of their impedances, the application of a signal of any frequency to the upper and lower corners of the bridge will result in the other two corners of the bridge being of equal potential. Accordingly if the bridge is balanced, the screen grid $G_2$ will be maintained at ground potential at all times.

Since the resistance in each of the four legs of the bridge is negligible, the conditions for bridge balance may be expressed in terms of reactance only as follows:

$$\frac{X_1}{X_2}=\frac{X_3}{X_4} \tag{1}$$

where:

$X_1$ is the reactance of $C_1$
$X_2$ is the reactance of $C_2$
$X_3$ is the reactance of $C_N$ and $L_2$
$X_4$ is the reactance of $C_{1-2}$ and $L_1$ In terms of the circuit parameters, Equation 1 may be developed as follows:

$$X_1=\frac{-1}{WC_1} \tag{2}$$

where:

$$W=2\pi f$$

$$X_2=\frac{-1}{WC_2} \tag{3}$$

$$X_3=WL_2-\frac{1}{WC_N}=-\frac{1}{WC_N}\left(1-\frac{W^2}{W_4^2}\right) \tag{4}$$

where:

$W_4=\frac{1}{\sqrt{L_2C_N}}$ = resonant angular frequency of $L_2$ and $C_N$ where:

$$X_4=WL_1-\frac{1}{WC_{1-2}}=-\frac{1}{WC_{1-2}}\left(1-\frac{W^2}{W_6^2}\right) \tag{5}$$

where:

$W_6=\frac{1}{\sqrt{L_1C_{1-2}}}$ = resonant angular frequency of $L_1$ and $C_{1-2}$ In substituting the above values of the four reactances in Equation 1:

$$\frac{C_2}{C_1}=\frac{C_{1-2}\left(1-\frac{W^2}{W_4^2}\right)}{C_N\left(1-\frac{W^2}{W_6^2}\right)} \tag{6}$$

Because of the presence of the term W in the above equation, it will be appreciated that the equation, and hence the conditions for bridge balance, are frequency sensitive. However, it will be apparent that $L_1$ is substantially equal to $L_2$ and that $C_N$ may have a selected value substantially equal to that of $C_{1-2}$. Under these circumstances, the resonant angular frequencies $W_4$ and $W_6$ of Equation 6 will be substantially equal. Equation 6 then becomes:

$$\frac{C_2}{C_1}=\frac{C_{1-2}}{C_N} \tag{7}$$

It will be seen, accordingly, that the condition for bridge balance and for neutralization of the inductance of the screen grid lead and for maintenance of the screen grid proper at ground potential is independent of frequency assuming that $L_1$ is substantially equal to $L_2$ and that $C_N$ is selected to be substantially equal to $C_{1-2}$. With the bridge thus balanced, the application of a signal to the input circuit leaves the screen grid at ground potential, the inductance of the screen grid lead being effectively neutralized.

The above analysis takes into account only three internal impedance characteristics of the vacuum tube 10. Two other internal impedances must be taken into account for a more complete elimination of feedback or neutralization of the inductive reactance of the internal screen grid lead, these being the control-grid-to-cathode capacitance $C_{1-K}$ and the inductance $L_K$ of the internal cathode lead, previously referred to and shown in FIG. 1. These impedances, in series, connect the control grid to ground and thereby form a three mesh network in combination with the simple four armed bridge analyzed above. This three mesh network is also shown in FIG. 2.

Since mathematical analysis of a three mesh network is quite complicated and is well understood in the art, only the end results are presented herein. With the complete three mesh network of FIG. 2 it may be shown that the conditions for bridge balance, and more particularly for null potential between the internal screen grid proper and ground are:

$$C_N=\frac{C_{1-2}\left(1-\frac{W^2}{W_4^2}\left(1-\frac{W^2}{W_6^2}\right)\right)}{\left(\frac{C_2+C_{1-K}}{C_1}\right)\left(1-\frac{W^2}{W_1^2}\right)-\frac{W^2}{W_2^2}\left(1-\frac{W^2}{W_3^2}\right)} \tag{8}$$

The various resonant angular frequencies included in Equation 8 are as follows:

$$W_1^2=\frac{1}{L_KC_3}$$

$$W_2^2=\frac{1}{L_1(C_{1-2}+C_{1-K})}$$

$$W_3^2=\frac{1}{L_KC_4}$$

$$W_4^2=\frac{1}{L_2C_N}$$

$$W_5^2=\frac{1}{L_KC_{1-K}}$$

where $$C_3=\frac{C_2C_{1-K}}{C_2+C_{1-K}}$$

$$C_4=\frac{C_{1-2}C_{1-K}}{C_{1-2}+C_{1-K}}$$

A typical solution of Equation 8 is given below, based upon the following practical values of the internal impedances and of the external impedance elements:

$L_1=L_2=.02\ \mu h.$
$L_K=.015\ \mu h.$
$C_{1-2}=3.0\ \mu\mu f.$
$C_{1-K}=1.5\ \mu\mu f.$
$C_1=9.1\ \mu\mu f.$
$C_2=8.2\ \mu\mu f.$

Various factors of Equation 8 then become:

$$C_3=\frac{8.2\times 1.5}{9.7}=1.27\ \mu\mu f.$$

$$C_4=\frac{1.5\times 3.0}{4.5}=1.0\ \mu\mu f.$$

$$W_1^2=\frac{10^{20}}{1.5\times 1.27}=.525\times 10^{20}\left(\frac{\text{radians}}{\text{second}}\right)^2=1155\text{ mc.}$$

$$W_2^2=\frac{10^{20}}{2.0\times 4.5}=.111\times 10^{20}\left(\frac{\text{radians}}{\text{second}}\right)^2=530\text{ mc.}$$

$$W_3^2=\frac{10^{20}}{1.5\times 1.0}=.666\times 10^{20}\left(\frac{\text{radians}}{\text{second}}\right)^2=1300\text{ mc.}$$

$$W_4^2=\frac{10^{20}}{2.0\times 3.0}=.166\times 10^{20}\left(\frac{\text{radians}}{\text{second}}\right)^2=648\text{ mc.}$$

$$W_5^2=\frac{10^{20}}{1.5\times 1.5}=.444\times 10^{20}\left(\frac{\text{radians}}{\text{second}}\right)^2=1060\text{ mc.}$$

Selecting $f=200$ mc., $$W^2=(2\pi f)^2=1.58\times 10^{18}$$

With substitution of these values, Equation 8 is reduced to:

$$C_N=2.92\ \mu\mu f.$$

It should be noted that the various resonant frequencies $W_1 \ldots W_5$ are all of such value as to offer little frequency selectivity with a signal frequency of 200 mc. Specifically,, the lowest resonant frequency is 530 mc. for $W_2$. The ratio of the incident frequency to the self-resonant frequency in this worst case is $W/W_2=200/530$ or .377. The correction term involving the square of this number is .142 which is quite small compared to unity. Accordingly, it will be appreciated that the self resonant frequencies of the various L–C branches of the bridge circuit will have little frequency selectivity effect.

It should be noted further that the frequency sensitive terms of Equation 8, those involving the term W along with one of the resonant frequencies $W_1 \ldots W_5$, while they may be appreciable in magnitude, have a tendency to cancel each other's effect whereby the variation from bridge balance with change in frequency of the applied signal is small.

The three mesh input bridge circuit of FIGS. 1 and 2 fails to take into consideration one significant effect for which compensation must be made if the best possible bridge balance is to be obtained. This effect involves the phase shift produced by the input resistance of the tube, generally designated $R_G$ and so shown in FIG. 3.

As is well known in the art, the so-called input resistance is a tube characteristic due to the sum of the effects of transient time electron lag and cathode lead inductance loading. The net effect is equivalent to that of a resistance, and this resistance is on the order of 500 to 1,000 ohms in conventional tube structures at the frequencies under consideration.

Figure 4:
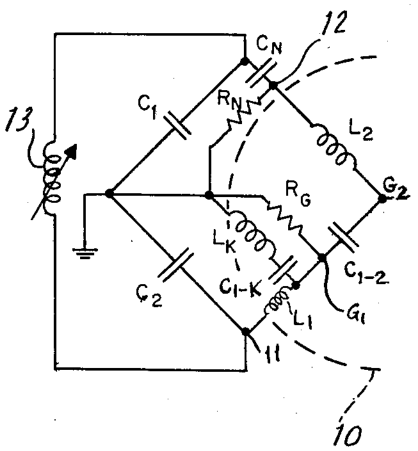
FIG. 4 is a diagram similar to FIG. 2 but showing a portion of the input circuit of FIG. 3.

By reference to FIG. 4, it will be seen that $R_G$ diverts current from an intermediate point on the lower right hand arm of the bridge to ground and thereby produces a phase shift which partially upsets the balance of the bridge.

Referring again to FIG. 3, it will be seen that a resistor $R_N$ is connected from the screen grid tube terminal 12 to ground. The effect of the resistor $R_N$ is best appreciated by reference to FIG. 4 wherein it may be seen that this resistor diverts current from an intermediate point on the upper right hand arm of the bridge to ground. The value of the resistor $R_N$ for obtaining substantial bridge balance may be calculated or may be determined by trial and error. For the circuit parameters specified above in connection with FIGS. 1 and 2, effective bridge balance is obtained when this resistor has a value of 10 ohms.

As will be apparent to those skilled in the art, the resistor $R_N$ could offset the effect of the input resistance $R_G$ if it were connected between ground and the upper corner of the bridge. The resistor $R_N$ would then merely parallel the capacitor $C_1$. However, this resistor would then have to be of substantial resistance value since it would be connected to a relatively high impedance point of the bridge. This would be objectionable since increase of the resistance value of the resistor $R_N$ increases the maximum screen-grid-to-ground impedance.

More specifically, it may be seen upon reference to FIG. 4 that when there is any significant degree of bridge unbalance, the screen grid is nevertheless connected to ground through the inductance $L_2$ and the resistor $R_N$. Since the resistor $R_N$ is connected to a low impedance point on the bridge and is, therefore, of low resistance value, the effect of any bridge unbalance to produce a potential difference between the screen grid and the ground is minimized by this low impedance path between the screen grid and ground. It will be apparent that this tendency of the resistor $R_N$ to reduce screen-grid-to-ground potential accompanying bridge unbalance is much greater than a 10 ohm resistor connected between the screen grid tube terminal 12 and ground than would be the case with a larger resistance connected in parallel with the capacitor $C_1$.

More generally, the resistor $R_N$ should be connected between ground and another point on the bridge which is of the lowest possible impedance, the resistor being, correspondingly, of the lowest possible resistance. Ideally, the resistor $R_N$ would be connected directly to the internal screen grid and would be of zero value. Since this is not practical, the resistor is connected to the screen grid tube terminal 12, this being the point on the bridge closest to the screen grid to which the resistor $R_N$ can be connected. This is an important feature of this embodiment of the invention since it minimizes the detrimental effect of bridge unbalance resulting from the small but inevitable frequency sensitivity of the bridge.

Further in this connection, it should be noted that an important factor producing bridge unbalance, and hence an important reason for reducing the detrimental effects of bridge unbalance, is the use of automatic gain control in radio frequency amplifiers. As will be apparent to those skilled in the art, variation of the control grid bias alters the value of the input resistance $R_G$. Furthermore, the value of $R_G$ varies inversely with the square of the frequency of the applied signal. Because of these factors, it is of substantial importance that the undesirable effects of bridge unbalance produced thereby be minimized.

Figure 3:
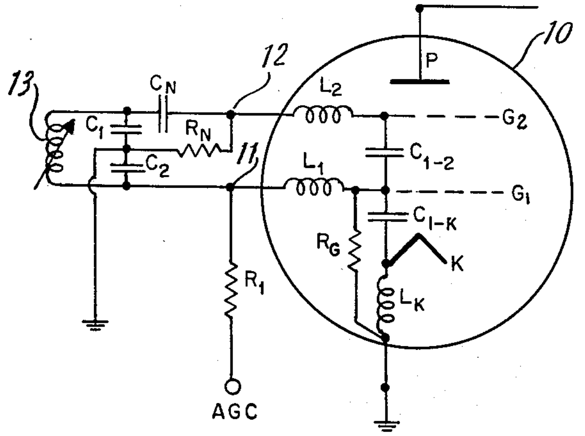
FIG. 3 is a partial circuit diagram similar to FIG. 1 but taking into consideration an additional internal impedance of the tube and incorporating an additional external impedance component.

It will now be seen that the present invention provides for a balanced bridge or network which in turn provides for the internal screen grid and ground to be at null points with respect to an input signal applied to two other points on the network, at least when the signal is of a selected frequency. Furthermore, the bridge or network is of such character as to be relatively insensitive to variation in frequency of the input signal. More particularly, the points of the bridge constituting the internal screen grid and the ground connection remain substantially null even though the frequency of the input signal varies over a substantial range. Still further, the network of FIGS. 3 and 4 is so arranged as to minimize the detrimental effect of the small but inevitable bridge unbalance resulting from variation of input signal frequency and/or from variation in control grid bias attending the use of AGC.

As will be appreciated by those skilled in the art, the reference herein to the grounding of one point of the network is based upon the assumption that the cathode is also grounded. In other words, it is intended that said point be grounded to the cathode. Still more fundamentally, it is intended that said point be grounded to the "cold" or "grounded" side of the input signal circuit. Where reference is made herein to the grounding of the screen grid, as is conventional in the art, it is intended that it be given this interpretation.

It should be noted that one factor which promotes and facilitates bridge balance is the fact that all of the various arms of the bridge or network are of the same general order of impedance value. Because of this, deviation from theoretical bridge balance resulting from manufacturing tolerances of the external impedance elements and of the internal tube impedances is minimized.

Figure 5:
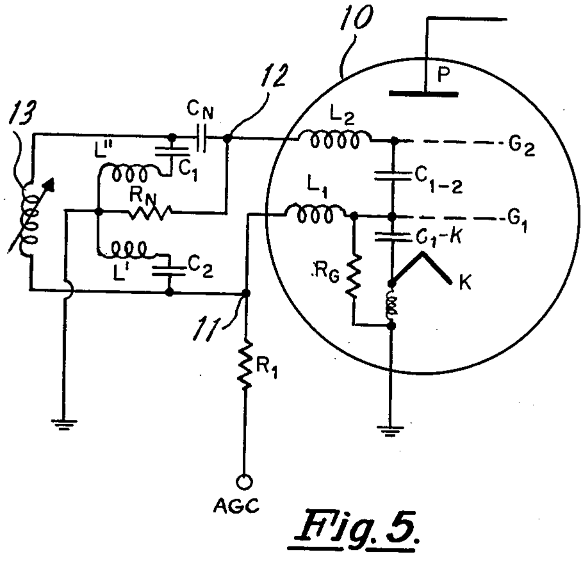
FIG. 5 is a partial circuit diagram similar to FIG. 3 but illustrating a different embodiment of the invention.
Figure 6:
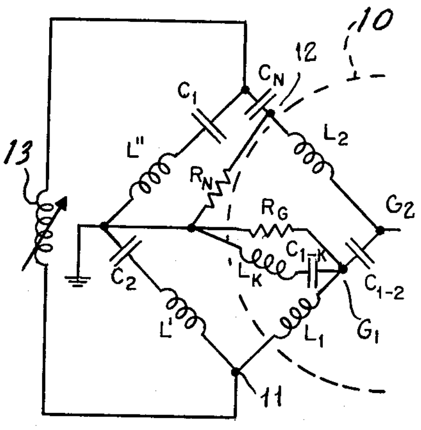
FIG. 6 is a diagram similar to FIGS. 2 and 4 but showing a portion of the input circuit of FIG. 5.

A modified form of the invention is illustrated in FIGS. 5 and 6. The circuit of FIG. 5 is identical to that of FIG. 3 with the exception that two external inductances L′ and L″ are arranged in series with the capacitors $C_2$ and $C_1$ respectively, as shown. Referring to FIG. 6, it will be seen that these inductances join with the associated capacitors to form the two left hand arms of the bridge, which bridge is otherwise identical to the bridge illustrated in FIG. 4.

As will be appreciated by those skilled in the art, the four basic or outer arms of the network of FIG. 6 may be precisely balanced for all frequencies of input signal. Furthermore, the ratio of the impedances of any two of the four outer arms of the network may remain constant at all frequencies simply by providing the same ratio of capacity to inductance in each of the four arms. With this condition existing in the four outer arms of the network, and with the impedance of all of the four outer arms being of the same general order of magnitude, it will be apparent to those skilled in the art upon reference to Equation 8, that even with the three mesh network (taking into consideration $L_K$ and $C_{1-K}$) the network will be less sensitive to frequency of the input signal than would otherwise be the case.

Since it is desired that the external inductors L′ and L″ be of the same general order of inductance as the internal inductances $L_1$ and $L_2$, it will be appreciated that these external inductors may comprise a coil of as little as one or two turns, and may even comprise a straight conductor having a length of several inches. Accordingly, it may be seen that inclusion of these external inductors in the network does not involve the addition of components of significant cost.

Figure 7:
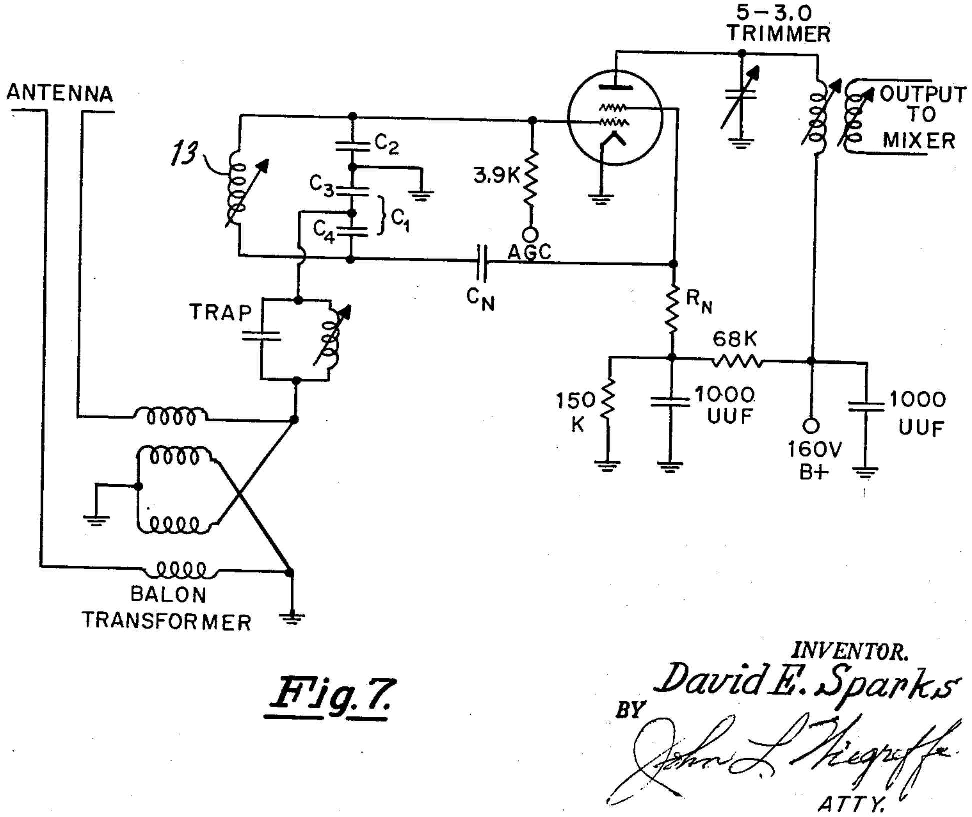
FIG. 7 is a more complete circuit diagram of a high frequency amplifier incorporating the form of the invention illustrated in FIGS. 3 and 4.

A more complete amplifier circuit is illustrated in FIG. 7 which incorporates the present invention. More particularly, the practical circuit of FIG. 7 incorporates the embodiment of the invention described above in connection with FIGS. 3 and 4.

In FIG. 7 the internal impedances are not schematically illustrated as in FIGS. 1–6. However, the external impedance components $C_1$, $C_2$, $C_N$ and $R_N$ are identified the same as in FIG. 4. It will be noted that $R_N$ is connected to ground through a capacitor which is designated in FIG. 7 as being of large capacitance. It will also be noted that the capacitor $C_1$ comprises two series connected capacitors $C_3$ and $C_4$ having capacities respectively of 22 μμf. and 13 μμf. whereby the effective capacity of $C_1$ is approximately 8.2 μμf. $C_2$ may be 8.2 μμf. and $C_N$ may be 3.0 μμf. $R_N$ may be 10 ohms.

The antenna may be connected to a point intermediate the capacitors $C_3$ and $C_4$ through a Balon transformer and a trap, these conventional components being designated by name in FIG. 7.

As will be apparent to those skilled in the art, the application of the input signal across the capacitor $C_3$ is equivalent to the application of the signal across the variable inductor 13, such that the input signal is, in effect, applied across the two capacitors $C_1$ and $C_2$ or across the upper and lower corners of the network illustrated in FIG. 4. The tube 10 may be a 6CY5. The output circuit is of conventional form, and since the various components are identified in FIG. 7 the circuit is not described in further detail herein.

In the preceding disclosure of the invention, selection of values for the external impedance elements is based entirely upon calculation. In practical electronic research it is common practice to modify calculated values in accordance with experimental test results, particularly where circuitry is involved having some characteristics which are not fully predeterminable, as in the present case.

In the present case it is recommended that external impedance elements of calculated values be employed in an experimental circuit and that they be modified experimentally until optimum results are obtained. Testing of the results for optimum effect may be accomplished in various ways, as will be apparent in view of the following analysis of one particular application of the invention.

In accordance with this particular application of the invention, the amplifier of FIGS. 1–7 is employed as an R.F. amplifier, or detector, of a television receiving set. In such an application the antenna circuit is preferably tuned to, or resonant at, a frequency which is substantially centered between the video carrier frequency and the audio carrier frequency of a given television transmission channel. In such case an adequate, predeterminable and substantially constant response to both the video and audio signals is obtainable provided that the resonant frequency of the antenna circuit does not vary. As is well recognized in the art, however, the input capacity, and hence the resonant frequency of the antenna circuit, varies with AGC bias if there is feedback from the output circuit to the input circuit. More particularly, the input capacity varies as a function of gain which varies, in turn, as a function of AGC bias. However, if feedback is substantially eliminated, change in AGC bias and gain has substantially no effect upon the input capacity or upon the resonant frequency of the antenna circuit. In turn, feedback can be substantially eliminated by maintenance of the internal screen grid proper at substantially the same A.C. potential as the cathode terminal.

One practical method of determining the effectiveness of the balanced bridge input circuit in maintaining the internal screen grid proper at ground potential is the measurement or detection of the resonant frequency of the antenna circuit as the AGC bias is varied. Such testing may be effected through the use of a sweep generator of the desired frequency range as a signal source, along with an oscilloscope or other suitable detecting apparatus for measuring or detecting the resonant frequency of the antenna circuit with variation of AGC bias. An oscilloscope may, for example, be arranged to detect the input signal as reflected from the antenna or input circuit of the amplifier, reflection being negligible when the frequency of the sweep generator output coincides with the resonant frequency of the antenna circuit, and becoming significant when the frequency of the sweep generator output differs substantially from the resonant frequency of the antenna circuit.

Since the testing apparatus and the testing procedure broadly referred to above are well known in the art and do not of themselves constitute a feature of the present invention they are not described in further detail herein. It is believed to be sufficient for the purpose of understanding the present invention that it be recognized that the calculated values of the external impedance elements employed in the input circuits of FIGS. 1–7 may in some cases be altered to advantage on the basis of experimental test results. It will be appreciated that in such cases the input circuit is made to compensate for the undesired effects of all pertinent circuit parameters, whether known or unknown. Examples of such parameters, having possible adverse effect upon desired circuit conditions, are the stray electric capacities associated with the screen-grid-to-plate capacity and the screen-grid-to-cathode capacity, these particular parameters being variable in value and difficult to compensate for on the basis of calculation alone. On the basis of calculated values for the external impedance elements, the effect of such factors as these is greatly reduced even though they are not directly compensated for. More specifically, the bridges described above will produce a smaller and a compromised tilting of the response curve with change in AGC bias, such that the maximum tilt of the response curve will be minimized. With calculated values of external impedance elements varied in accordance with experimental test results, the input circuit is made to compensate specifically for these and other pertinent variable circuit parameters.

It will be appreciated that where a vacuum tube having five or more electrodes is employed, different ones of several grids may be employed as the screen grid, whether or not it may normally be so designated. Where the term, "screen grid," is employed herein, it is to be understood that reference is made to a grid employed as a screen grid, regardless of its normal designation.

A method and apparatus have now been disclosed whereby the inductance of the internal lead of the screen grid of a vacuum tube is neutralized and the Miller effect substantially eliminated, at least at a selected frequency. Furthermore, the disclosed method and apparatus provide for this desirable effect over a wide range of frequencies of the input signal.

While there have been described what are at present considered to be the preferred embodiments of the invention, it will be understood that various modifications may be made therein, and it is intended to cover in the appended claims all such modifications as fall within the true spirit and scope of the invention.

The invention having thus been described, what is claimed and desired to be secured by Letters Patent is:

1. In combination; a high frequency vacuum tube including a cathode, a control grid, and a screen grid; means for maintaining the potential of said screen grid at substantially the potential of said cathode comprising; a bridge connected input circuit including one arm consisting in part of the internal lead impedance of said screen grid; another arm of said bridge including the internal lead impedance of said control grid and the internal impedance between said control grid and said screen grid; third and fourth arms including first and second additional impedance elements respectively, mounted exteriorly of said tube and completing said bridge connected input circuit, one corner of said bridge being selected on said screen grid, the opposed corner to said one corner being connected to said cathode; means for impressing a signal across the remaining two corners of said bridge; said additional impedance elements being selected such that both said one corner and said opposed corner are at null points for at least a selected frequency, whereby said screen grid is maintained at a potential substantially equal to that of said cathode.

2. In combination in a high frequency amplifier including a vacuum tube having an input circuit and an output circuit; said input circuit including a first electrode and a second electrode; said output circuit including said first electrode and a third electrode, a fourth electrode interposed between said second electrode and said third electrode, all of said electrodes having internal lead impedances; means for maintaining said fourth electrode at a reference potential comprising: a bridge arrangement in said input circuit in which the internal lead impedance of said fourth electrode is included in one arm of said bridge; another arm of said bridge including the internal lead impedance of said second electrode and the internal impedance between said second and said fourth electrodes; one corner of said bridge being selected on said fourth electrode; the corner of said bridge opposed to said one corner being connected to said reference potential; first and second additional impedance elements exteriorly arranged in said input circuit, as respective third and fourth arms of said bridge, to complete said bridge arrangement; means for impressing signals across the remaining corners of said bridge arrangement; said impedance elements being selected such that said one corner and said opposed corner of said bridge are at null points at least for a selected signal frequency.

3. A high frequency amplifier circuit including an electron discharge device having an electron emitting electrode, a control electrode, a shield electrode and an electron receiving electrode; said shield electrode desirably being maintained at a reference potential to minimize feedback between said receiving electrode and said control electrode due to internal capacitances between said electrodes; each of said electrodes having internal lead inductances as a result of connecting leads between each said electrode and corresponding connection points outside said electron discharge device; means for maintaining the potential of said shield electrode at said reference potential comprising; a bridge arrangement consisting of a first capacitor in a first arm of said bridge, a second capacitor in a second arm of said bridge, a third capacitor and the internal lead inductance of said shield electrode in a third arm of said bridge, and the internal lead inductance of said control electrode and the internal capacitance between said shield electrode and said control electrode in a fourth arm of said bridge, one corner of said bridge being selected at the internal connection of said shield electrode; the corner opposite said one corner, formed by the junction of said first and said second capacitors, being connected to said reference potential and being connected to the outside connection point of said emitting electrode; the remaining corners of said bridge formed by the junction of said first capacitor and said third capacitor, and by the junction of said second capacitor and the outside connection point of said control electrode; the values of said first, second and third capacitors being chosen to place said one corner and said opposite corner of said bridge at null points; and means for impressing signals across said remaining corners of said bridge.

4. In a high frequency amplifier including a vacuum tube having a cathode electrode, a control grid electrode, and a screen grid electrode, said tube being operated in a frequency band such that the internal leads connecting said electrodes with corresponding external connection points on said tube have substantial inductive reactance; means for maintaining said screen grid at substantially ground potential comprising; a bridge connected input circuit, a first arm of which includes the internal lead inductance of said screen grid, a second arm of which includes the internal capacity between said control grid and said screen grid; a first external impedance included in a third arm of said bridge, and a second external impedance included in a fourth arm of said bridge, wherein said screen grid is selected as one corner of said bridge and the corner opposite thereto is grounded, said first and second external impedances being chosen such that said one corner and said opposite corner are at null points on said bridge; and means for applying signals within said frequency band to the remaining corners of said bridge.

5. In a high frequency amplifier as claimed in claim 4, further including a resistor externally connected between said cathode electrode and said screen grid electrode for counteracting the phase shifting effect of the internal input resistance of said vacuum tube.

6. In a high frequency amplifier as claimed in claim 4, wherein said first and said second external impedance components are capacitors.

7. In a high frequency amplifier as claimed in claim 6, wherein the connecting leads of said capacitors have substantial inductive reactance at the frequencies in said frequency band.

References Cited in the file of this patent

UNITED STATES PATENTS

| | | |
|---|---|---|
| 1,582,470 | Horle | Apr. 27, 1926 |
| 1,974,912 | Buschbeck | Sept. 25, 1934 |
| 2,119,315 | Buschbeck | May 31, 1938 |
| 2,770,683 | Jackson | Nov. 13, 1956 |
| 2,790,036 | Tongue | Apr. 23, 1957 |

FOREIGN PATENTS

| | | |
|---|---|---|
| 453,400 | Great Britain | Sept. 10, 1936 |